United States Patent [19]

Hamamoto et al.

[11] Patent Number: 4,879,843
[45] Date of Patent: Nov. 14, 1989

[54] DUAL PURPOSE DOOR SYSTEM

[75] Inventors: Atsushi Hamamoto; Mikio Ichiki, both of Kobe, Japan

[73] Assignee: Kawasaki Jukogyo Kabushiki Kaisha, Kobe, Japan

[21] Appl. No.: 95,783

[22] Filed: Sep. 14, 1987

[30] Foreign Application Priority Data

Sep. 12, 1986 [JP] Japan ................................ 61-214045

[51] Int. Cl.$^4$ ............................................. E06B 11/00
[52] U.S. Cl. ....................................... 49/158; 49/176; 49/223; 14/69.5; 105/436
[58] Field of Search .................. 49/141, 158, 209, 221, 49/223, 176, 250, 252; 105/436; 14/71.1, 69.5

[56] References Cited

U.S. PATENT DOCUMENTS

| 1,253,160 | 1/1918 | Doak ..................................... 49/221 |
| 4,718,812 | 1/1988 | Smalley et al. ........................ 14/69.5 |

FOREIGN PATENT DOCUMENTS

| 179788 | 12/1886 | France ................................ 105/436 |
| 459450 | 6/1913 | France ................................. 14/71.1 |
| 2152567 | 8/1985 | United Kingdom .................. 49/223 |

Primary Examiner—James T. McCall
Assistant Examiner—Gerald D. Anderson
Attorney, Agent, or Firm—Schwartz & Weinrieb

[57] ABSTRACT

A dual-purpose door system includes a door to be snugly received within an aperture of a vehicle body. The door has the lower end pivotally connected to a slide unit which is mounted upon the body and movable in an outward/inward direction and a sideward direction together with the door for thereby opening and closing the door in an ordinary mode of the system, and the upper end detachably received and guided by a guide unit mounted upon the body. The system further includes an extension board pivotally supported at its one end to the top end of the door and outwardly swingable about the one end subsequent to an outward pivotal movement of the door so as to provide an extended stepping board or path for the passengers in an emergency mode of the system. There is provided a buffer for absorbing objectionable pulses or shock loads which may be impressed upon the door and the board when they are opened in accordance with the latter mode.

20 Claims, 12 Drawing Sheets

DUAL PURPOSE DOOR SYSTEM

BACKGROUND OF THE INVENTION

1. Field of the Invention

The present invention relates to a door system for opening and closing a door, and more particularly a dual-purpose door system suitable for both an ordinary use and an emergency use.

2. Description of the Prior Art

A door system is of course normally provided upon a passenger vehicle such as, for example, a train, a bus, a plane and etc. the like. A known door system is designed for either of two purposes, that is, an ordinary use and an emergency use. There is also known a dual-purpose door system which is designed for both of these purposes.

A known door system for an emergency use which is provided upon a bus or a train car, where door systems for the two purposes are usually provided separately, is unsatisfactory in that it is necessarily equipped with auxiliary apparatus such as, for example, a stepladder for assuring the safe escape of the passengers from the deck floor onto the ground. Some train cars have installed with in the front wall thereof an emergency door which is adapted to pivot outwardly and downwardly, however, this type of door is restricted with respect to its installation location.

For an emergency escape, the dual-purpose door system is advantageous in that the passengers can use the same conveniently and safely in their accustomed manner and also in that it can be manufactured economically. Japanese Patent Application Pre-Examined Publication No. 61-110563 discloses such a dual-purpose door system. The disclosed system, however, has a drawback in that the effective dimension of the openable passage space of the system changes depending upon the operational mode. A door system widely openable in the ordinary mode renders the same narrowly openable in the emergency mode, or vice versa. The system has another drawback in that the size of the stepboard of the system restricts the dimension of the openable space of the system.

OBJECT OF THE INVENTION

It is therefore an object of the present invention to provide a dual-purpose door system used for a passenger vehicle, in which system a sufficient openable space is allowed both for the ordinary and emergency modes and the overall dimension of the door system is not restricted by the size of the stepboard.

SUMMARY OF THE INVENTION

According to a first aspect of the present invention, a dual-purpose door system being used for a passenger vehicle and having a door snugly receivable within an aperture of the body of the vehicle and openable in first and second modes, comprises:

a slide unit disposed within the body adjacent to a bottom end of the aperture and having a hinge means connected to a lower end of the door for pivotally supporting the door such that the door is movable in an outward/inward direction and a sideward direction; a guide unit disposed upon the body adjacent to the top end of the aperture of the body for detachably receiving and guiding the door;

a selector unit for switching the operative direction of the slide unit and for switching the movement of the door guided by and along the guide unit;

a buffer unit disposed upon the body and having a buffer cord operatively connected to the door, the buffer unit being adapted to feed the cord at a controlled rate so as to regulate the speed at which the door opens in accordance with the second mode; and at least one support unit each having a support cord and foldable rods and connected to each other and also operatively connecting the door to the body.

According to a second aspect of the invention, a dual-purpose door system being used for a passenger vehicle and having a door snugly receivable within an aperture of the body of the vehicle and openable accordance within first and second modes, comprises:

a slide unit disposed within the body adjacent to the bottom end of the aperture and having a first hinge means connected to the lower end of the door for pivotally supporting the door such that the door is movable in an outward/inward direction and a sideward direction;

a guide unit disposed upon the body adjacent to the top end of the aperture of the body for detachably receiving and guiding the door;

a selector unit for switching the operative direction of the slide unit and for switching the movement of the door guided by and along the guide unit;

a buffer unit disposed upon the body and having a buffer cord operatively connected to the door, the buffer unit being adapted to feed the cord at a controlled rate so as to regulate the speed at which the door opens in accordance with the second mode;

a first support unit having a support cord and foldable rods and operatively connected between the door and the body;

an extension board having one end pivotally connected by a second hinge means to a top end portion of the door; and a second support unit operatively connecting the extension board to the first support unit and being foldable therewith.

BRIEF DESCRIPTION OF THE DRAWINGS

Various othr objects, features, and attendant advantages of the present invention will become more apparent from the following detailed description, when considered in connection with the accompanying drawings, in which like reference characters designate like or corresponding parts throughout the several views, and wherein.

DETAILED DESCRIPTION OF THE PREFERRED EMBODIMENT

Figure 1:
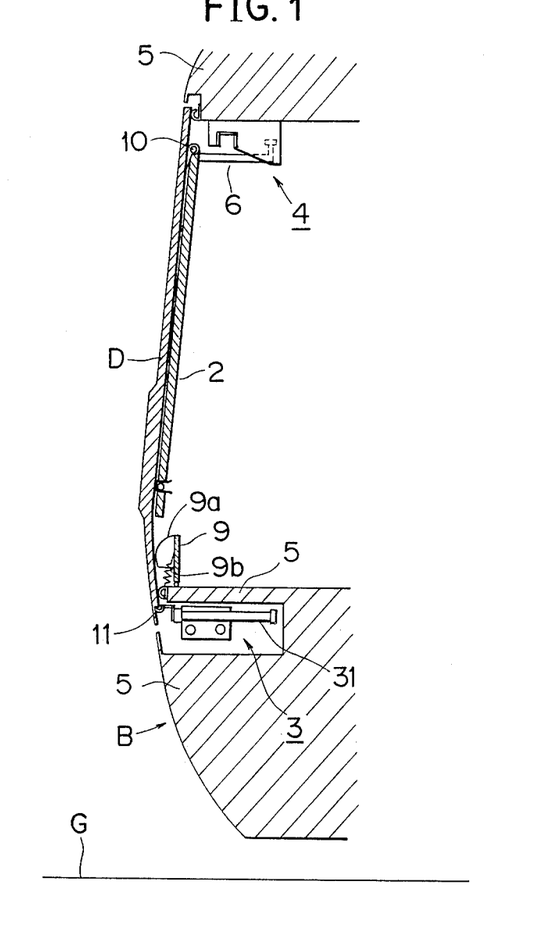
FIG. 1 is a side elevational view of the dual-purpose door system in its closed position according to the present invention.
Figure 2:
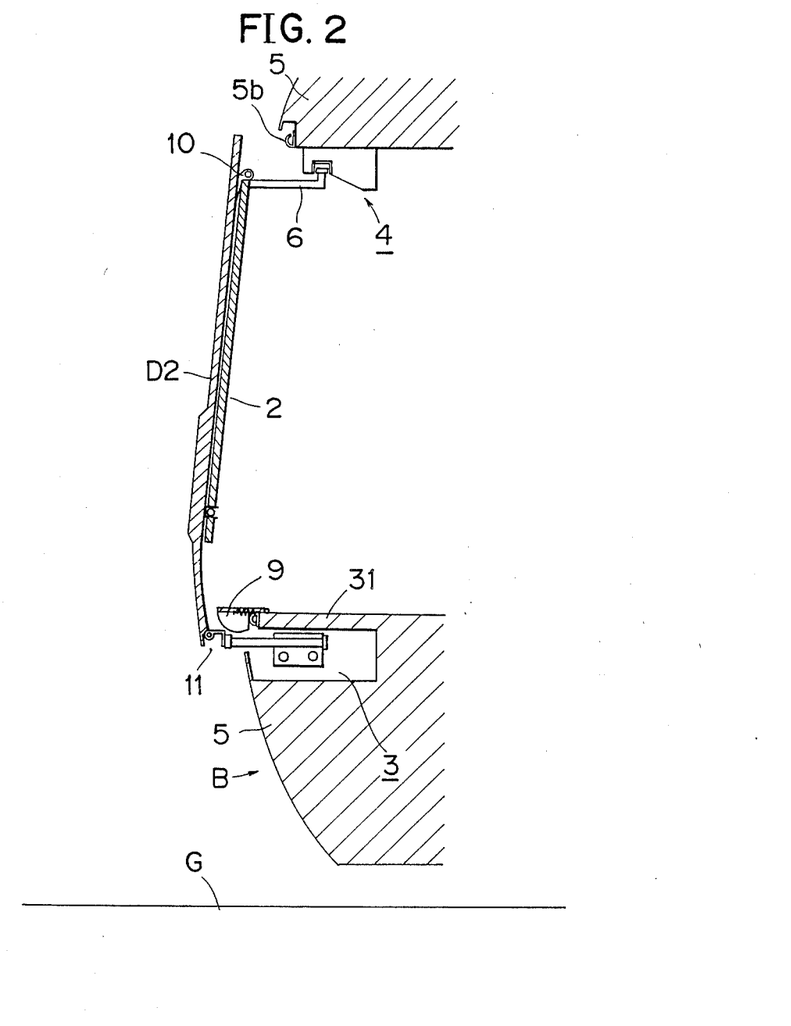
FIG. 2 is a side elevational view of the dual-purpose door system of the present invention in an opened position.

A door system is mounted upon a body B of a car. As shown in FIGS. 1 and 2 the door system according to the first aspect of the present invention, includes a door 1, a slide unit 3 for slidably supporting the door and a guide unit 4 for guiding the movement of the door.

The door 1 is of the plug-in type and is movable between the closed position of FIG. 1 and an opened position of FIG. 2 in an ordinary mode. The door has the lower end there of pivotably connected by means of a hinge 11 to the slide unit 3 disposed with a lower portion of the car body B for the purpose to be described subsequently. The door has near the upper end thereof an arm 6 having a roller at its distal end, which arm is guided by means of the guide unit 4 disposed within an upper portion of the body B.

Figure 3:
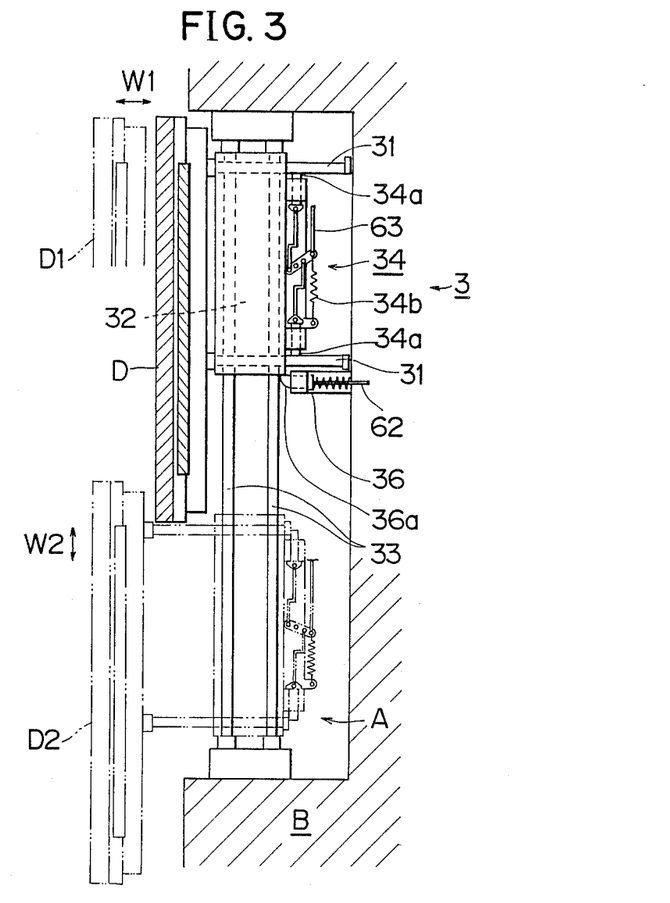
FIG. 3 is the plan view of the slider unit with some parts omitted.
Figure 4:
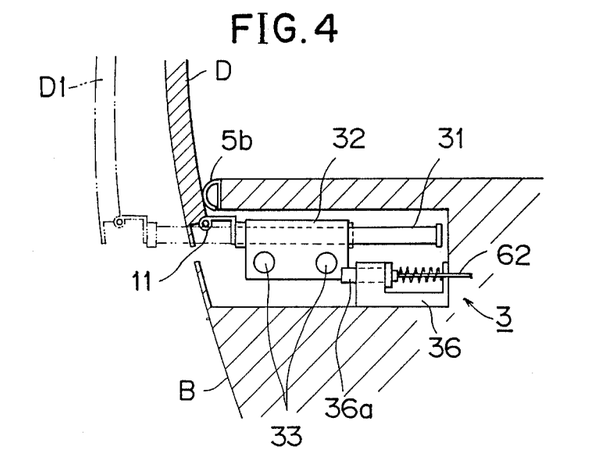
FIG. 4 is a side elevational view of the slider unit.

As shown in FIG. 3, the slide unit 3 includes a first pair of laterally spaced, parallel bars 33, 33 which are secured to the car body B at their opposite ends, a slider 32 slidably movable along the first bars 33, 33, and a second pair of longitudinally spaced, parallel bars 31, 31 extending perpendicularly with respect to the first bars 33, 33 and received within the slider 32. The lower end of the door 1 is hinged by means of the hinges 11 to the outer ends of the second bars 31. With this slide unit, the door is supported so as to move both in an outward/inward direction indicated by an arrow W1 and a sideward direction indicated by an arrow W2 in the ordinary movement mode.

The slide unit also includes a bar stopper 34 for locking the door in its outermost position of the ordinary movement mode (as indicated by the phantom lines in FIG. 3) and prevents the same from inadvertently returning to the innermost position (as indicated by the solid lines in FIG. 3). The bar stopper 34 has a pair of stops 34a which are movably supported upon the slider 32 and normally urged by means of a spring 34b so as to engage the corresponding second bars 31 as shown by means of solid lines in FIG. 3 and lock the same in their extended mode as indicated by the reference numeral A. The stops 34a are disengaged from the second bars 31, 31 by pulling a cord 63 operatively connected by means of links to the stops 34a.

The slide unit also includes a slider stopper 36 disposed upon the car body B and having a stop 36a operatively connected to an actuating cord 62. The stop 36a is normally urged so as to project into the path of the slider 32 for blocking the movement of the slider 32, and has an arcuate cam surface (FIG. 7) at its distal end for a purpose to be described subsequently.

When the door is unlocked by actuating a door lock mechanism of the system as described subsequently, the door and hence the second bars 31 slidingly move to the outermost position D1 under the influence of its own weight since the door is disposed at an inclined position about the hinged lower end and thus the center of gravity is located inwardly of a vertical plane passing through to the hinge 11. In case the door is not inwardly inclined when disposed at in the closed position, a lower portion of the door is manually forced to move outwardly.

Then, with the stop 36a of the slider stopper 36 disposed out of the slider path, the door 1 is moved sidewardly to a position D2 as seen in FIG. 3 free from interference with the car body B as the slider 32 slides along the first bars 33.

The number of the first and second bars 33 and 31 is not limited to two.

An inwardly inclined door as described hereinabove is advantageous in that the door does not prematurely pivot outwardly and downwardly when the door system is switched into the emergency mode.

Figure 5:
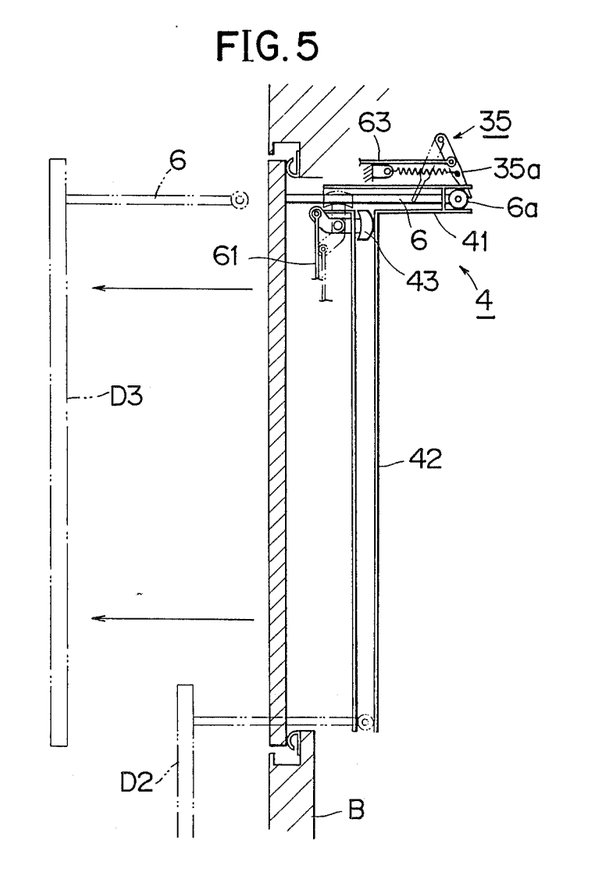
FIG. 5 is a schematic plan view of the guide unit.
Figure 6:
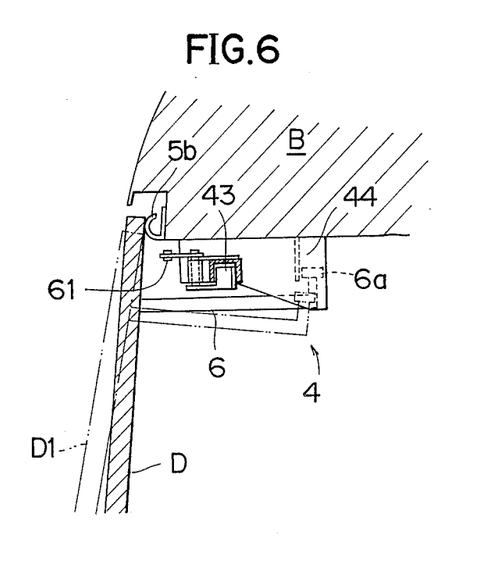
FIG. 6 is a side elevational view of the guide unit.

The guide unit 4 is disposed upon the car body B adjacent to the upper end of the door 1 for guiding the roller 6a of the arm 6 as shown in FIGS. 5 and 6. The guide unit includes a guide channel 41 extending in the outward/inward direction W1, and a sideward guide channel 42 extending perpendicularly to the guide channel 41 in the direction W2 and communicating with the same. A dividing block 43 (of a selector unit 60 described subsequently) is disposed within the vicinity of the junction of the two guide channels. The arm roller 6a is received within either one of the two channels 41 and 42 by selectively positioning the dividing block 43 within the two channels 42 and 41.

With the dividing block 43 disposed at a position corresponding to the emergency mode as indicated by means of the solid lines in FIG. 5, the door 1 can be moved straight outwardly in the direction W1 to a free position D3 where the upper end of the door is disengaged from the body B as the arm roller 6a moves through the guide channel 41 and is disengaged from the same. On the other hand, with the dividing block 43 disposed the ordinary mode as indicated by means of the phantom lines in FIG. 5, the door is moved outwardly and then sidewardly to the opened position D2, as the arm roller 6a is first moved along the guide channel 41 until it is blocked by means of the dividing block 43, whereupon the arm roller 6a advances sidewardly into the sideward guide channel 42.

When the lower end of the door is moved outwardly in accordance with the unlocked mode of the door system, the upper end of the door can be released from the guide unit so as to move toward its open position. More specifically, the air roller 6a is disengaged from a stop plate 44 of the guide unit 4 as seen in phantom lines of FIG. 6 while the arem 6 moves toward the position D1, is also shown by means of phantom lines in FIG. 6.

Figure 7:
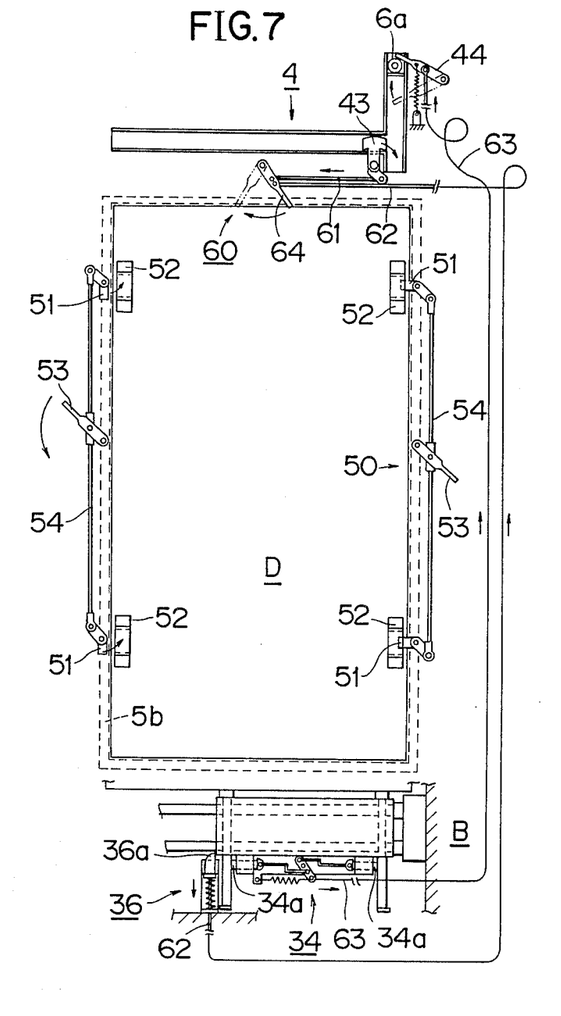
FIG. 7 is a diagrammatical view of the lock mechanism.

The door system also includes a pair of door lock units 50 for selectively locking the door against the movement thereof despite the actuation of the selector unit 60. As shown in FIG. 7, the door lock units each includes an actuating lever 53 pivotably supported upon the door frame of the car body B, a pair of connecting rods 54 operatively connected at one end thereof to the lever 53, a pair of stops 51 attached to the other ends of the rods 54, and a pair of pockets 52 disposed upon the door 1 for receiving the respective stops 51 so as to lock the door. The lock unit 50 at the right side in FIG. 7 is disposed in a locking mode whereas the other unit 50 at the left side is disposed in an unlocked mode.

The selector unit 60 serves is provided for switching the operational mode of the door system, that is, to the ordinary mode or the emergency mode, and includes a selector handle 64 pivotally supported upon the body B. The selector handle 64 is operatively connected to the dividing block 43 and the slider stopper 36 by means of connecting cords 61 and 62, respectively. In FIG. 7, the handle 64 is disposed in the emergency mode as shown by means of the solid lines.

In order to switch to the ordinary mode, the handle 64 is turned to a position indicated by means of the phantom lines so as to move the dividing block 43 into the guide channel 41 and retract the stop 36a of the slider stopper out of the slider travel path.

An unlocking lever 35 is disposed partly within the guide channel 41 and is operatively connected to the bar stopper 34 by means of a cord 63 as shown in FIGS. 5 and 7. When the arm 6 on the upper end of the door is inserted from an external position into the guide channel 41 and the arm roller 6a is engaged by means of the lever 35, the stops 34a of the bar stopper 34 are retracted so as to allow for the inward movement of the second bars 31.

In the first phase according to the first aspect of the invention, the door system operates as follows:

In order to open the door 1 in the ordinary mode, the selector handle 64 is set in the ordinary mode position, thereby retracting the the stop 36a of the slider stopper 36 so as to unlock the slider 32 and also moving the dividing block 43 angularly into the second guide channel 41 so as to prevent the roller 6a of the arm 6 from leaving the second guide channel 41. Then the door lock units 50 are unlocked so that the lower portion of the door 1 slides outwardly under the influence of its own weight as already described. At this time the upper portion of the door 1 is pushed outwardly until it is stopped by means of the dividing block 43 and then the door 1 is moved sidewardly so as to open in the ordinary manner as the arm roller 6a slides along the sideward guide channel 42.

In order to close the door 1 in the ordinary mode, the reverse procedure is followed. In case the selector handle 64 is inadvertently disposed in the emergency mode when the door is to be closed, the slider 32 moves back along the bars 33 so as to push the stop 36a of the slider stopper 36 aside due to the arcuate cam surface configuration of the stop, the arm roller 6a also moving back so as to force the dividing block 43 forwardly therewith.

In order to open the door 1 in the emergency mode, the door lock units 50 are unlocked with the selector handle 64 set in the emergency mode, whereupon the lower portion of the door 1 slides outwardly under the influence of its own weight and the the stops 34a of the bar stopper 34 project outwardly so as to prevent the inward movement of the second bars 31. Then the door is manually pushed outwardly with the result that the arm roller 6a is released from the first guide channel 41 and the door pivots downwardly and outwardly about the hinge 11. At this time, the door system proceeds to move according to the second aspect of the present invention as described hereinbelow.

Figure 12:
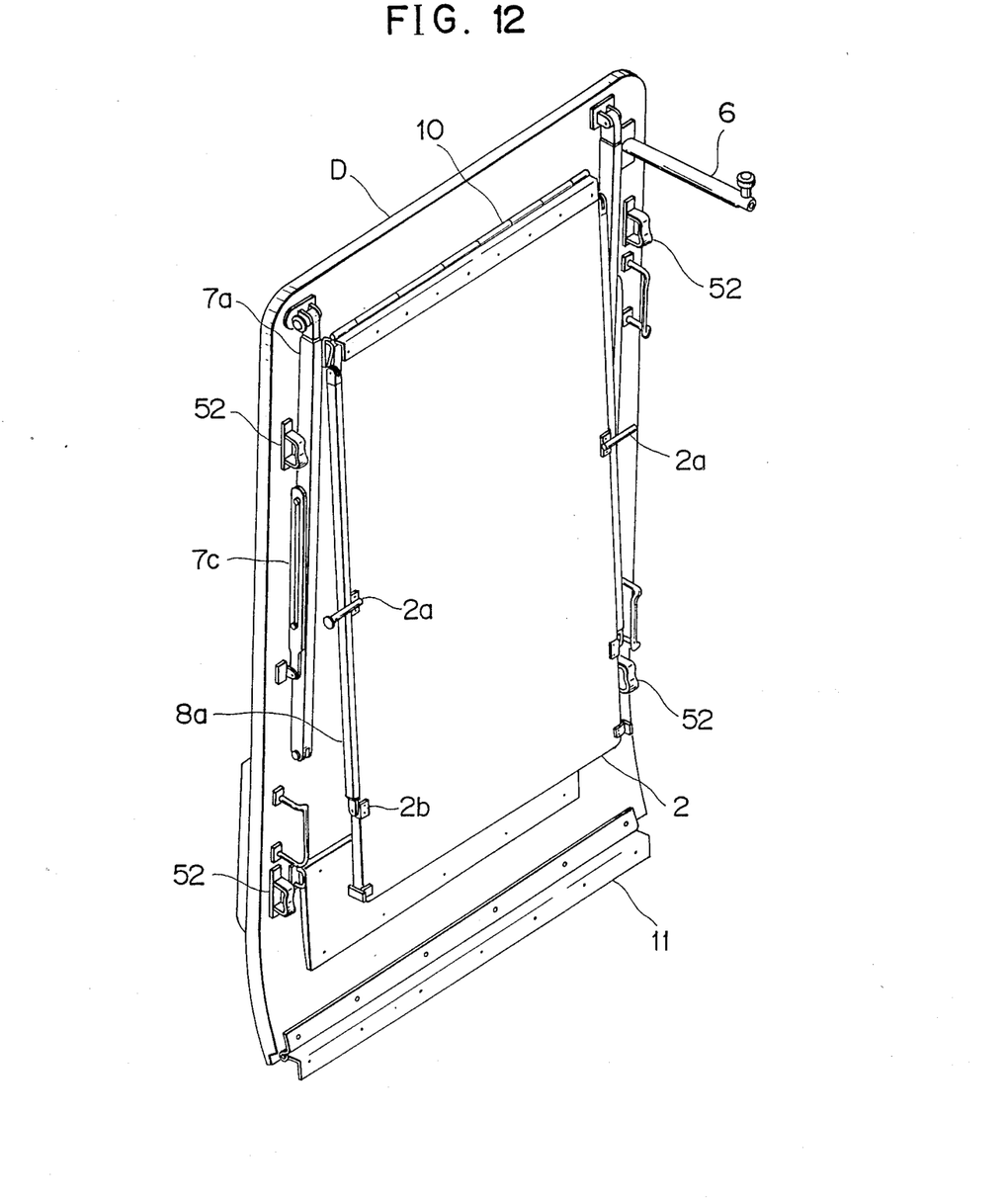
FIG. 12 is a rear perspective view of the dual-purpose door.
Figure 13:
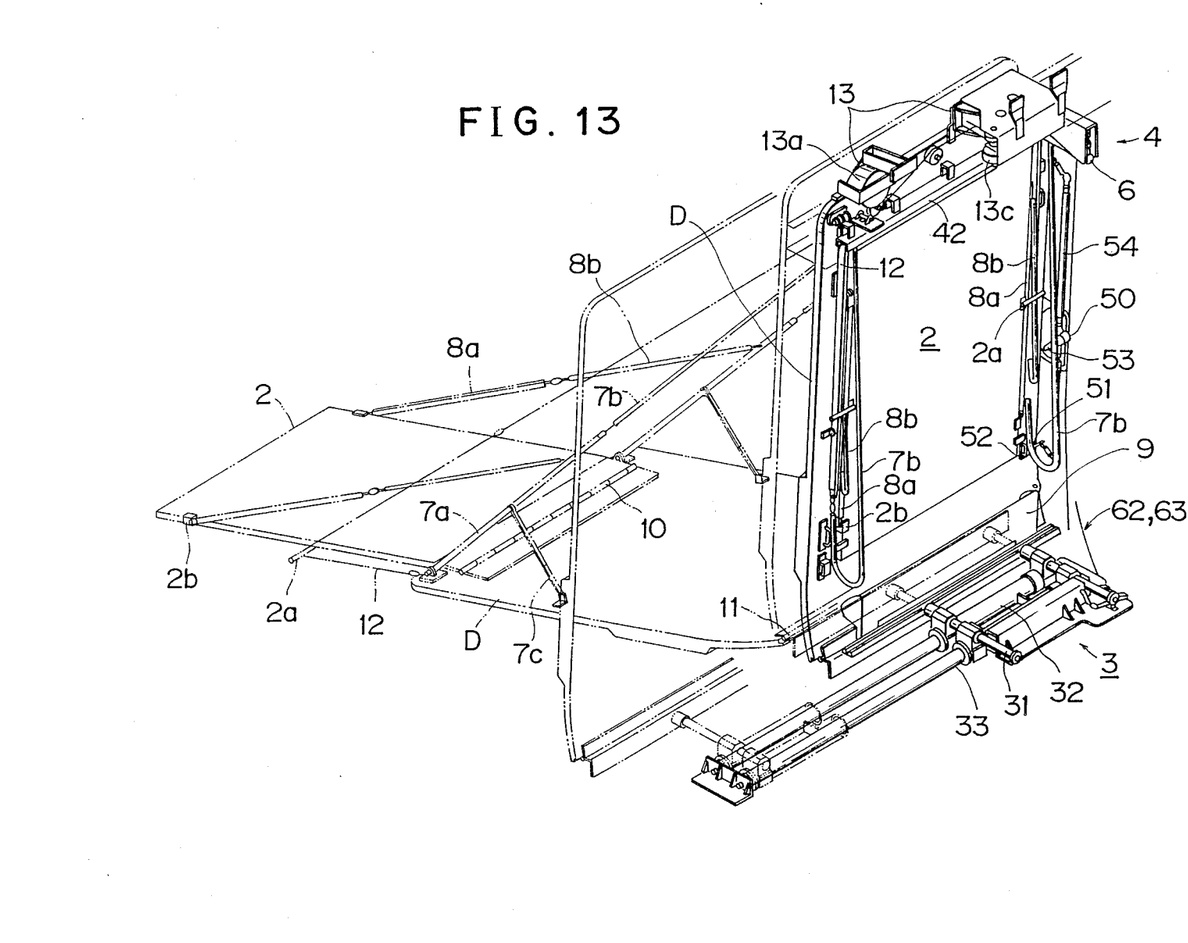
FIG. 13 is a rear perspective view of the dual-purpose door system shown in its closed mode in solid lines, and in both of its ordinary and emergency use modes in dotted or phantom lines.

According to the second aspect of the invention, the door system includes a mechanism for controlling the downwardly and outwardly movement of the door in a smooth and stable manner so as to provide for the safe escape of the passengers. To this end, the door system includes an extension board 2 extendibly supported upon the door, a pair of first support units 7 and a pair of second support units 8 both mounted at opposite side edges of the door 1, and a buffer unit 13 disposed upon the ceiling of the door frame of the body B as shown in FIGS. 8, 12, and 13.

Figure 8:
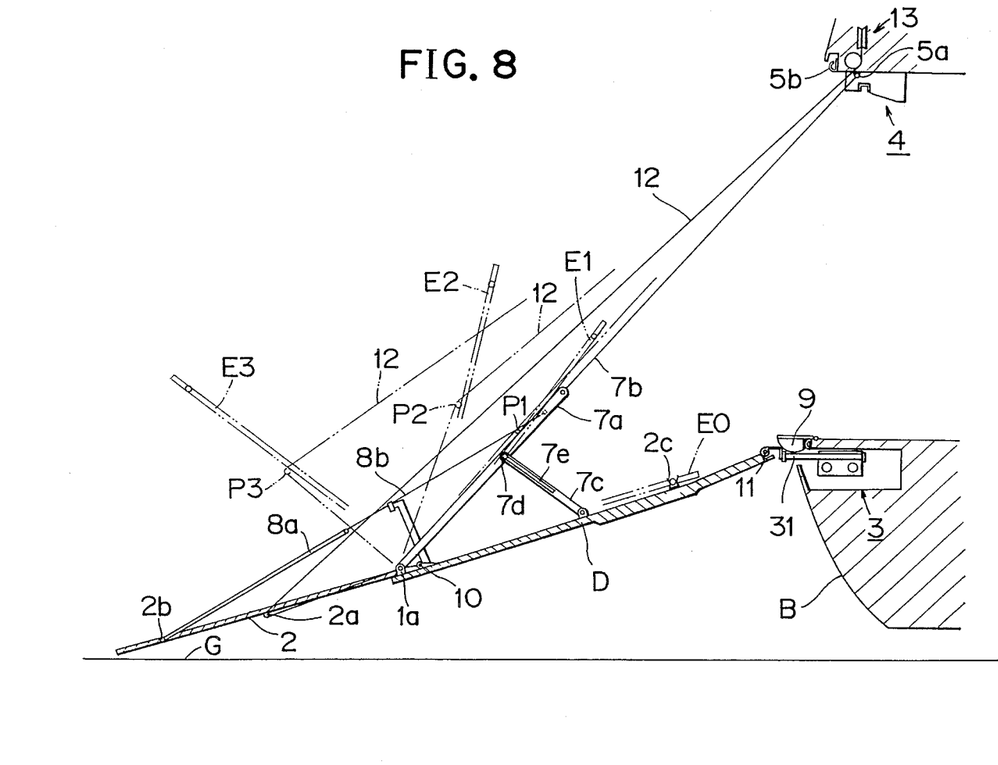
FIG. 8 is a side elevational view of the door system, showing the manner in which the door is opened in an emergency mode.

FIG. 8 shows the manner in which the door system operates according to the second aspect of the invention.

The extension board 2 is disposed upon the rear or back of the door 1 and is pivotally connected at the top end thereof to the upper portion of the door by means of a hinge 10.

The first support units 7 each includes a first rod 7a pivotally connected at one end thereof to a pivot 1a disposed adjacent to the top end of the door 1, a length of a first supporting cord 7b connecting the other end of the first rod 7a and a lug 5a fixed upon the ceiling of the door frame of body B, and an auxiliary bar 7c extending between an intermediate portion of the door and the first rod 7a. All of the components are normally folded into a linear form parallel to the door D. The auxiliary bar 7c has at one end portion an elongate slot 7e slidably receiving a projection 7d disposed at an intermediate portion of the first rod 7a and is pivotally supported at the other end there of upon an intermediate portion of the door 1. When the door 1 is fully opened to its pivoted emergency position so as to be disposed onto or close to the ground G as shown by the solid lines in FIG. 8, the first support rod 7a is suspendingly supported by means of the first supporting cord 7b.

The second support units 8 each includes a second bar 8a pivotally connected at one end thereof to a pin 2b secured to one side edge of the door adjacent to the top end thereof, and a length of a second connecting cord 8b extending from the other end of second bar 8a to the first bar 7a.

Figure 9:
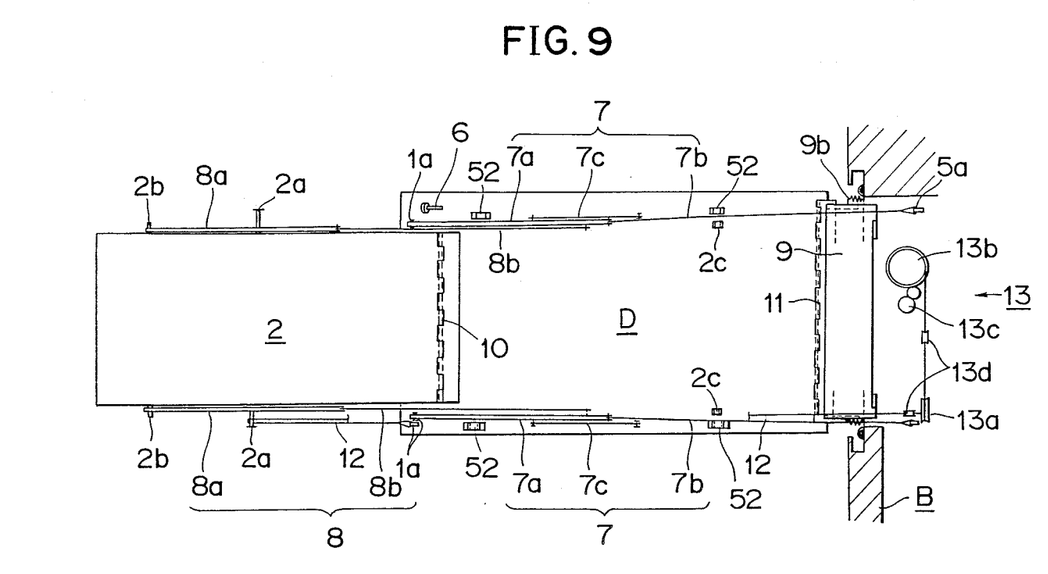
FIG. 9 is a plan view of the door system with the door opened in the emergency mode.

The buffer unit 13, as best shown in FIG. 9, includes a buffer 13a for controlling the feeding rate of a buffer cord 12, a drum 13b upon which the cord 12 is wound, a winder 13c for driving the drum so as to rotate the same for winding the cord 12 thereon, and pulleys 13d for guiding the cord 12. The buffer is preferably a known brake means for frictionally engaging the cord so as to control the feeding of the buffer cord 12 at a predetermined rate, and operates only when the cord 12 is fed. The buffer cord 12 is connected to the pivot 1a at the top end of the door 1.

In the second phase according to the second aspect of the invention, the door system operates as follows:

As shown in FIG. 8, subsequent to the first phase, the door 1 pivotally moves about the hinge 11 so as to open downwardly and forwardly into a suspended position when the door is suspended by means of the first supporting cord 7b and the first rod 7a. During this operation, the door is pivotably opened slowly since it is also suspended by means of the buffer cord 12 being fed at the controlled rate by means of the buffer unit 13. This arrangement prevents an objectionably fast movement and/or a bounce of the door which can of course be dangerous to the passengers.

At this time, the extension board 2 is pivotally moved from a position EO where it is secured by means of a pair of clips 2c receiving the pins 2b to a position E1 where the board 2 is raised as a result of the first rods 7a engaging the pins 2a. The extension board 2 is successively moved to positions E2, E3 whereupon each pin 2a engages the buffer cord 12 so as to insure that the board 2 moves at the controlled rate. The board finally moves to a position indicated by means of the solid lines where it is engaged with the ground or suspended slightly away from the ground by means of the second support unit 8.

With this arrangement, the door D and extension board 2 are supported in a stable manner at the final position of shown by means of the solid lines. In this embodiment, the first and second support units are provided in pairs at the opposite sides of the door assembly, respectively. However, the two units 7 and 8 may be provided upon only one side of the door, if the door and board are rigid enough to withstand the load, that is, the weight of the passengers.

In order to restore the thus extended door system to the housed or stored position for the door and the extended extension board 2, the winder 13c is actuated so as to wind the buffer cord 12 around the drum 13b, whereupon the pins 2a of the board are first pulled upwardly thereby moving the board back to the position E1. With continued winding of the cord 12, the door D begins to be moved toward its original plugged or closed position defined within raised is finally the opening of the car body B. During this operation, the first rods 7a and the auxiliary bars 7c are folded and the pins 2a are forced against the door. At this time, the board 2 is secured to the door D by locking the pins 2b within the clips 2c. In an emergency use, the clips 2c may release the pins 2b when a relatively strong force is externally applied to the board 2.

When the door D is restored within the opening of the vehicle body, the arm roller 6a of the arm 6 disposed at the top of the door is allowed to move back in and along the first guide channel 41 and into the position D1 indicated by means of the phantom lines in FIG. 6, during which time the dividing block 43 is disposed in the position indicated by means of the solid lines in FIG. 5. During this movement of the arm roller 6a, the roller pushes the lever 35a of the unlocking unit 35 for operating the cord 63 which is connected to the bar stopper 34 as shown in FIG. 7, thus causing the stops 34a to retract to their unlocked position. Then the lower end portion of the door is moved back inwardly within the vehicle body by pulling a suitable grip, not shown, disposed upon the door so as to cause the second bars 31 to slide through the slider 32 so that the door is returned to the closed position where the door is fit substantially into the opening of the body B as indicated by means of the solid lines in FIG. 6. To complete the securement of the door the lock units 50 are locked.

Figure 10:
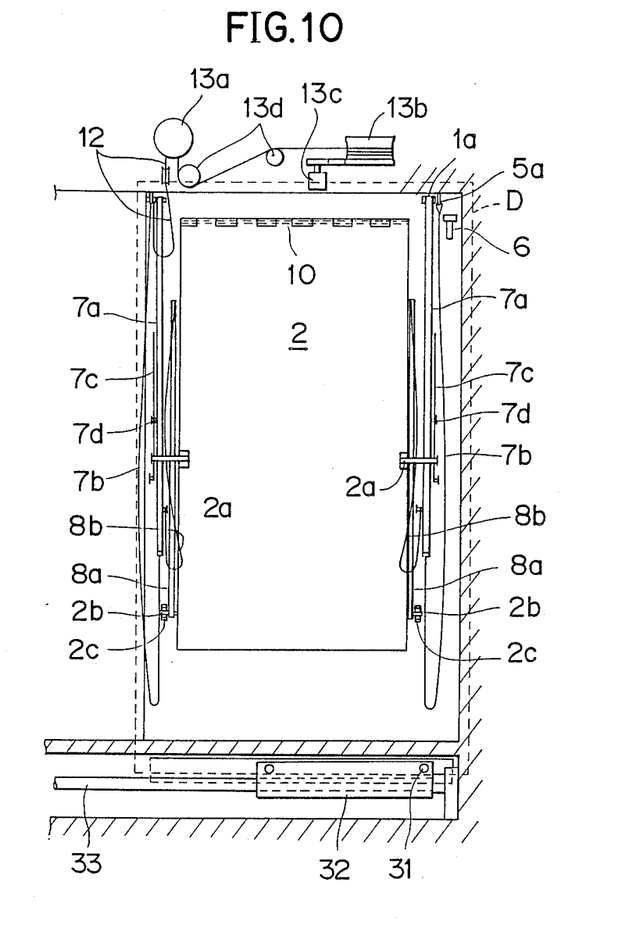
FIG. 10 is a rear view of the system with the door closed.

FIG. 10 shows the door D in its rear view, in which the first and second support rods 7a and 8a are held against the door by means of the pins 2a in their folded position, while the supporting cords 7b, 8b and the buffer cord 12 are hanging down loosely. The buffer cord has a hanging portion long enough to allow the door D to slide during at the initial stage.

Figure 11:
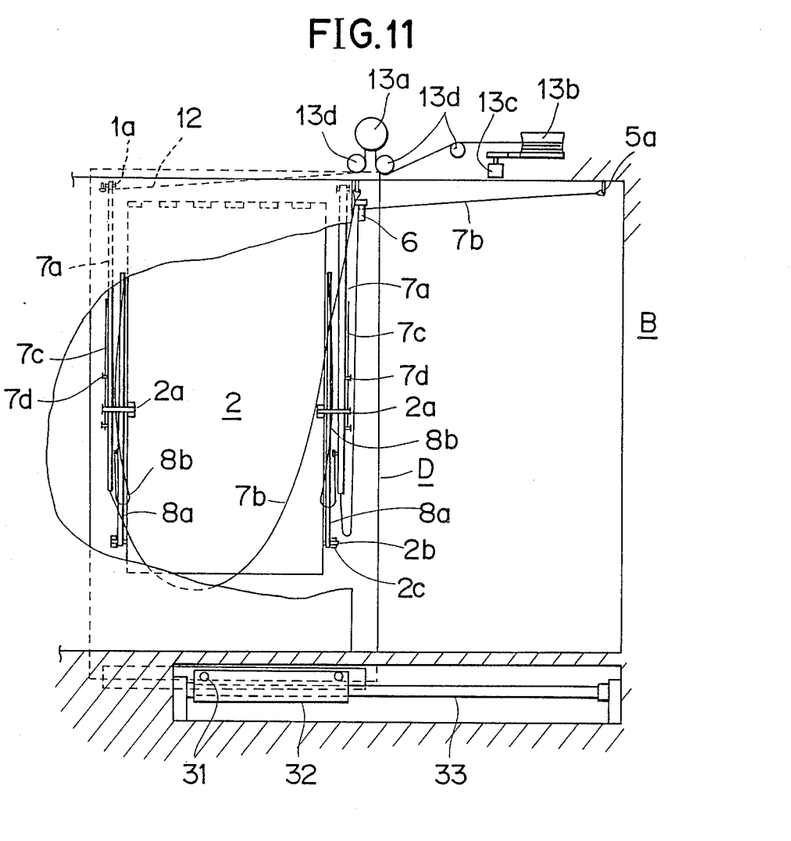
FIG. 11 is a rear view of the system with the door opened in the ordinary mode.

FIG. 11 shows the door in its rear view, in which the door is opened in the ordinary mode. The supporting cord 7b at the right side of the door is suitably guided by means of the arm 6 of the door so as not to hang into the open space for enabling the free passage of the passengers therethrough. The hung position of the buffer cord 12 has a predetermined length so as not to interfere with the operation of the door. The first supporting cord 7b at the left side of the door is hung within the space defined between the door D and the body B.

It is possible that all of the units except for the slide unit 3 of the door system of the invention can be disposed interiorly of the body B and that the door can be opened from a position outside of the body B in the ordinary mode if the lock unit 50 is disposed upon the outside of the door D.

In this embodiment, the bar stopper 34 can be carried by means of the slider 32 and moved together therewith, when opened in the ordinary mode, for preventing the door D from returning to its engaged position with the body B. However, the bar stopper 34 do not have to be moved with the slide unit, if the center of gravity of the combined body of the door and the extension board lies sufficiently inwardly of the vertical plane passing through the axis of the hinge 11 disposed at the lower end of the door.

As an auxiliary component, there is provided a step board 9 pivotally connected to the floor of the body B and normally urged by means of a tension spring 9b into an ordinary use mode position as shown in FIGS. 2, 8 and 9. The step board 9 operates irrespective of the operational mode of the door system. The step board 9 has a projection 9a having an arcuate cross section serving as a cam surface, which the door engages for causing the board 9 to assume a vertical position as shown in FIG. 1 when the door is closed. The step board serves for bridging or narrowing the gap defined between the floor of the body B and the door D when the latter is disposed in its pivoted, emergency use mode position. To this end, the step board may have a suitable shape and size.

There is also provided a plurality of seal elements 5b at suitable locations upon the body B for sealing the door to be plugged within the opening of the body B, as shown in FIGS. 2, 4, 6, 7 and 8.

With the foregoing arrangements, the door system according to the present invention has the following advantages:

a. A single door system operates in two modes, that is, the ordinary mode and the emergency mode without restricting the respective functions, which has not been achieved by means of any prior art system.

b. The system can be actuated to the emergency mode by means of manipulation conducted only from inside the car body without interfering with the passage of the passengers.

c. In the ordinary mode, it is possible to open and close the door from both the inside and outside of the body.

d. The system provides an aperture of almost the same dimension for the passage of the passengers in both the emergency and ordinary modes.

e. The angled slope of the door opened in the emergency mode is not affected by means of the dimension of the door.

f. The door and the extension board are kept maintained free from any impulse or shock loads by means of the buffer which would otherwise be caused when the door is opened in the emergency mode, thereby achieving an extended service life of the system. Obviously, many modifications and variations of the present invention are possible in light of the above teachings. It is therefore to be understood that within the scope of the appended claims, the present invention may be practiced otherwise than as specifically described herein.

What is claimed is:

1. A dual-purpose door system, capable of being opened in two different modes, comprising:
a door frame defined within a supporting wall;
a door mounted within said door frame;

first means for opening said door in accordance with a first one of said two different modes by moving said door long a first path which comprises movement along a first path portion in a first direction, substantially perpendicular to a plane within which said door frame and said supporting wall are disposed, to a predetermined location point, and subsequently along a second path portion in a second direction substantially perpendicular to said first direction and parallel to said plane within which said door frame and said supporting wall are disposed;

second means for opening said door in accordance with a second one of said two different modes by moving said door along a second path which comprises movement along said first path portion in said first direction, substantially perpendicular to said plane within which said door frame and said supporting wall are disposed, to said predetermined location point, and subsequently along a second path portion which is a continuation of said first path portion in said first direction beyond said predetermined location point so as to permit pivotable movement of said door about a lower edge portion thereof; and selector means operatively cooperating with said first and second means for selectively permitting operation of said first means, while preventing operation of said second means, when said door is to be opened in accordance with said first one of said two different modes; and for selectively permitting operation of said second means, while preventing operation of said first means, when said door is to be opened in accordance with said second one of said two different modes.

2. A dual-purpose door system as set forth in claim 1, wherein:
said door is a plug-type door mounted flush within said door frame with respect to an outer surface of said supporting wall.

3. A dual-purpose door system as set forth in claim 1, wherein:
said supporting wall comprises a sidewall of a passenger vehicle.

4. A dual-purpose door system as set forth in claim 1, further comprising:
step-board means mounted upon said supporting wall for spanning a gap defined between said supporting wall and said door when said door is disposed in said open position when said door has been pivoted it its open position in accordance with said second one of said two different modes.

5. A dual-purpose door system as set forth in claim 4, wherein:
said step-board means is pivotably mounted upon said supporting wall between an inoperative position and an operative position spanning said gap.

6. A dual-purpose door system as set forth in claim 5, further comprising:
spring-biasing means interposed between said step-board means and said supporting wall for biasing said step-board means toward said operative position.

7. A dual-purpose door system as set forth in claim 5, further comprising:
cam means mounted upon said step-board means for engaging said door when said door is disposed in its closed position for moving said step-board means to said inoperative position.

8. A dual-purpose door system as set forth in claim 1, wherein:
said door is inclined with respect to a vertical plane passing through through said lower edge portion thereof so as to be disposed inwardly toward the inside of said support wall whereby the center of gravity of said door is disposed inwardly of said vertical plane.

9. A dual-purpose door system as set forth in claim 1, further comprising:
buffer means interconnecting said supporting wall and said door for controlling the pivotable movement of said door about said lower edge portion thereof during said second one of said two different opening modes.

10. A dual-purpose door system as set forth in claim 9, wherein said buffer means comprises:
a buffer cord having one end connected to said door;
a drum, having the other end of said buffer cord wound thereon, mounted upon said supporting wall;
means operatively connected to said drum for winding said buffer cord thereon; and
brake means operatively connected to said drum for frictionally restricting the pay-out rate of said buffer cord as said door is pivotably moved to said open position in accordance with said second one of said two different modes.

11. A dual-purpose door system as set forth in claim 10, further comprising:
first auxiliary means interconnecting said door and said supporting wall for supporting said door when said door is pivotably moved to said open position in accordance with said second one of said two different modes.

12. A dual-purpose door system as set forth in claim 11, wherein said auxiliary supporting means comprises:
a collapsible rod assembly attached to said door; and
a support cord interconnecting said collapsible rod assembly with said supporting wall.

13. A dual-purpose door system as set forth in claim 12, further comprising:
an extension board pivotably mounted upon said door within the vicinity of an upper edge portion thereof; and
second auxiliary means interconnecting said extension board to said first auxiliary means.

14. A dual-purpose door system as set forth in claim 13, wherein:
said second auxiliary means comprises a collapsible rod assembly connected at one thereof to said extension board, and a support cord interconnecting said collapsible rod assembly of said extension board to said collapsible rod assembly of said door.

15. A dual-purpose door system as set forth in claim 13, further comprising:
pin means extending laterally outwardly from at least one side edge portion of said extension board for engaging said buffer cord so as to control the pivotably movement of said extension board relative to said door.

16. A dual-purpose door system as set forth in claim 1, wherein:
said first and second means comprise slider means mounted within the vicinity of a lower portion of said door frame, and guide track means mounted within the vicinity of an upper portion of said door frame.

17. A dual-purpose door system as set forth in claim 16, wherein:
said slider means comprises a first set of bars disposed in said second direction, a slider unit movable along said first set of bars in said second direction, and a second set of bars slideably movable through said slider unit in said first direction and supporting said door such that said door can move in said first direction as a result of movement of said second set of bars relative to said slider unit, and said door can move in said second direction as a result of movement of said slider unit along said first set of bars; and
said guide track means comprises a first guide track extending in said first direction; a second guide track extending in said second direction; and a guide arm secured to an upper region of said door at one end thereof and having a guide roller mounted upon another end thereof for engagement within said first and second guide tracks.

18. A dual-purpose door system as set forth in claim 17, further including:
hinge means interconnecting said lower edge portion of said door and said second set of bars for permitting said pivotable movement of said door.

19. A dual-purpose door system as set forth in claim 17, wherein:
said selector means comprises a block member selectively disposed within said first and second guide tracks for permitting movement of said guide roller within one of said first and second guide tracks while simultaneously preventing movement of said guide roller within the other one of said first and second guide tracks.

20. A dual-purpose door system as set forth in claim 17, further comprising:
stopper means mounted upon said slider for engaging end portions of said second set of bars opposite the ends of said second set of bars supporting said door for locking said second set of bars and said door in said open position corresponding to said movement in accordance with said first one of said two different modes.

* * * * *